April 24, 1928. Re. 16,942
F. M. REID
TRAILER LOCK
Original Filed Feb. 21, 1925 2 Sheets-Sheet 1
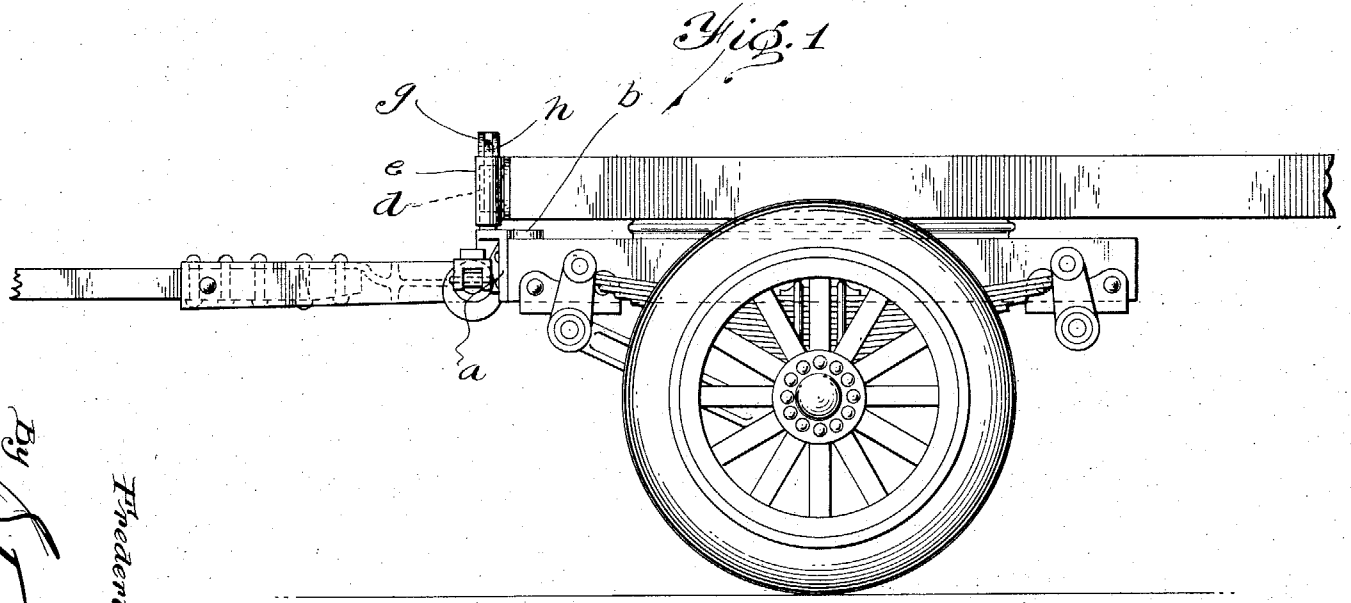
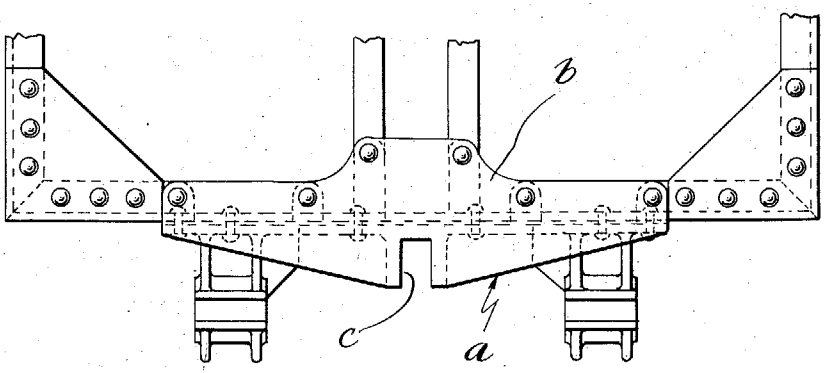
Inventor
Frederick Malcolm Reid
By Stuart C. Barnes
Attorney April 24, 1928. Re. 16,942

F. M. REID

TRAILER LOCK

Original Filed Feb. 21, 1925 2 Sheets-Sheet 2

Inventor
Frederick Malcolm Reid

By Stuart C. Barnes
Attorney

Reissued Apr. 24, 1928. Re. 16,942

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

TRAILER LOCK.

Original No. 1,566,617, dated December 22, 1925, Serial No. 10,747, filed February 21, 1925. Application for reissue filed January 29, 1927. Serial No. 164,593.

This invention relates to center locking devices for trailers. It is the object of the invention to provide a simple, strong, sturdy lock of an automatic character, in which the automatic feature may be simply discontinued by throwing a lever from one side to the other. This will be more fully explained hereinafter.

In the drawings:

Fig. 1 is a framentary side elevation of a trailer equipped with the improved center lock.

Fig. 4 is a plan view showing the table member in the gear frame.

The trailer is provided with a drawhead *a*, which is provided with an integral lock table *b* and is provided at the center with a keeper socket *c*. A spring-pressed vertically guided bolt *d* is slidable in the bolt housing *e*, which is riveted to the chassis frame of the trailer. The keeper socket and the lock table, which are part of the drawhead, are riveted to the frame of the truck, or what we sometime call the "gear frame."

Figure 2:
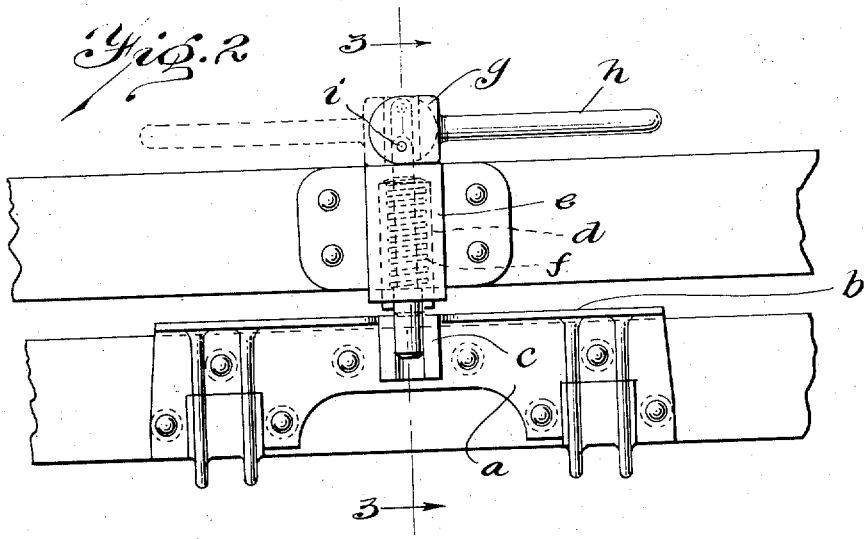
Fig. 2 is a fragmentary front elevation showing the lock.
Figure 3:
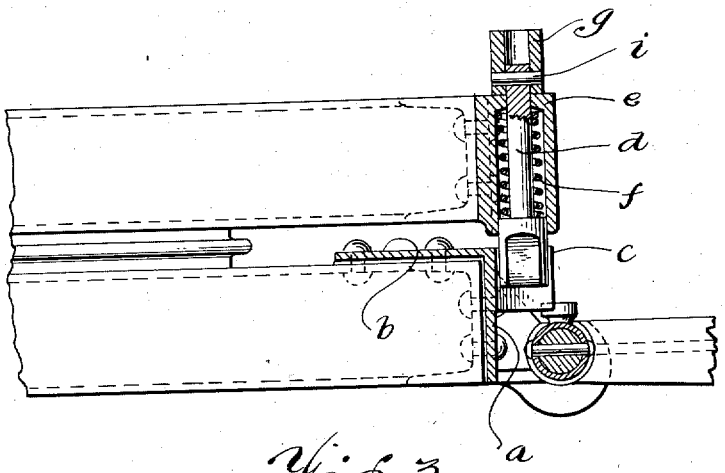
Fig. 3 is a vertical section taken on the line 3—3 of Fig. 2.

The coil spring *f* engages against the shoulder on the bolt head and within the bolt socket and tends to project the bolt. On the top of the bolt housing is located a lever *h* which has an eccentric fulcrum *g* secured to the upper end of the bolt by means of the pivot pin *i*. The pivot pin is eccentrically located on the circular fulcrum or roll of the lever at substantially a 90-degree point with respect to the attachment of the lever to this roll or fulcrum. Now obviously by simply throwing the lever over from the position shown in the full lines to the position shown in the dotted lines in Fig. 2, the lock is taken from the position of action to the position of inaction. It will be seen that in the position shown in the full lines the lever, together with the roll fulcrum, can rise above the bolt bracket when the lower end of the bolt slides along the table. This action facilitates the locking of the gear frame to the trailer, in that it is not necessary to align the bolt and the keeper socket before locking, which would be quite a difficult task, especially with a heavy, or loaded trailer. The gear frame is positioned so that the bolt rests at any point on the table *b*, whereupon the gear frame is turned on its vertical pivot, and this may be done by the use of a tractor attached to the drawbar where the trailer is particularly heavy, or loaded, and when the keeper socket comes under the bolt, the same will snap into place. When the gear frame reaches center position with respect to the chassis frame, the lock will automatically shoot into the keeper socket. This makes a very strong lock which can be easily manufactured and applied to the chassis frame. The lock itself is a separate unit which may be manufactured as a unit and riveted as a unit to the chassis frame. The keeper socket simply is an integral part of the drawhead as is also the table along which the lock slides.

The trailer shown is one which includes a main trailer frame with a sub-frame or gear frame for the wheels, which has a fifth wheel connection with the main frame. While the member with the keeper socket is shown on the gear frame and the movable latch member on the main frame, it is within the invention to reverse the position of these parts so that the keeper socket member is on the main frame and the latch member on the gear frame.

What I claim is:

1. A center lock for vehicles, having in combination an upper member, a lower member, with two members arranged to have relative movement with respect to each other, a bolt guide housing on the one member, a table provided with a center keeper socket on the other member, a sliding bolt guided in the bolt guide and tending to project into the keeper socket when lined up therewith, and means connected with the outer end of the sliding bolt and operating in direct connection with the bolt guide housing to either release the bolt for automatic projection into the keeper socket or else to set the bolt against projection into the keeper socket.

2. A center lock for vehicles, having in combination an upper member, a lower member, the two members arranged to have relative movement with respect to each other, a bolt guide housing on the one member, a table provided with a center keeper socket on the other member, a sliding bolt guided in the bolt guide and tending to project into the keeper socket when lined up therewith, and a lever which can be thrown from one side to the other and which is connected at the outer end of the bolt and operates in direct connection with the bolt guide housing for throwing the bolt out of operation or releasing the bolt for automatic projection into the keeper socket.

3. A center lock for vehicles, having in combination an upper member, a lower member, the two members arranged to have relative movement with respect to each other, a bolt guide housing on the one member, a table provided with a center keeper socket on the other member, a sliding bolt guided in the bolt guide housing and tending to project into the keeper socket when lined up therewith, and a lever having a roll-like fulcrum eccentrically connected wtih the outer end of the bolt and bearing against the guide housing so that by throwing the lever to the one side of center the bolt is held out of operation and turning it to the other side of center the bolt is released for automatic projection into the keeper socket.

4. A lock for trailers and gear frames, having in combination with a trailer and a gear frame, a lock guide bracket which can be secured to the trailer frame, a bolt guided vertically in said bracket, a spring for projecting the bolt downwardly, a table provided with a center keeper socket secured to the gear frame, and a lever having a roll-like fulcrum bearing on the top of the bolt guide bracket and having an eccentric pivot connection with the upper end of the bolt.

5. In a trailer having a main frame and a gear frame mounted to turn on a vertical pivot, a lock for locking the two frames together against relative movement, comprising a table mounted on one of the frames extending substantially from one side of the frame to the other so as to be at all times under the hereinafter mentioned latch, said table being provided with a keeper socket, a latch mounted on the other frame, said latch having a normal tendency to move toward the table and socket, whereby the two frames may be positioned relative to each other so that the latch rests upon the table and then the two frames moved relative to each other until the latch moves into the keeper socket.

6. In a trailer having a main frame and a gear frame mounted to turn on a vertical pivot, a lock for locking the two frames together against relative movement, comprising a relatively long table mounted on one of the frames, said table having a keeper socket disposed substantially centrally of the table, and a bolt mounted on the other frame which has a normal tendency to move toward the table which is of such length as to at all times support the bolt, whereby, to lock the frames together, they may be positioned so that the bolt engages any part of the table, and then the two frames turned relative to each other so that the bolt rides along the table and moves into the keeper socket when the same comes into alignment with the bolt.

7. In a trailer having a main frame and a gear frame mounted to turn on a vertical pivot, a lock for locking the two frames together against relative movement, comprising a table secured to the gear frame and projecting forward over the front of the frame to which it is secured so as to be at all times under the hereinafter mentioned bolt in the swinging of the gear frame, said table having a keeper socket, and a bolt mounted upon the main frame, said bolt having normal tendency to move downwardly toward the gear frame, whereby the two frames may be locked together by turning the gear frame on its vertical pivot with the bolt sliding on the table until the keeper socket comes in alignment therewith and the bolt moves into the keeper socket, and means for holding the bolt in raised position to prevent locking of the frames when relative movement between the frames is desired.

8. In a trailer having a main frame and a gear frame mounted to turn on a vertical pivot, a lock for locking the two frames together against relative movement, comprising a relatively long table mounted on the gear frame having a substantially centrally disposed keeper socket, a bolt mounted on the main frame and arranged to ride over said table wherever said bolt extends forward of the gear frame, spring means for urging said bolt toward the table, means for holding the bolt against such movement caused by the spring, said holding means being releasable to permit the bolt to move under the action of said spring, whereby the two frames may be locked by turning the gear frame on its vertical pivot with the bolt riding on the table until the keeper socket aligns with the bolt and the bolt is spring-pressed into the keeper socket.

9. In a trailer having a main frame and a gear frame mounted to turn on a vertical pivot, a lock for locking the two frames together against relative movement, comprising a member which forms an essential part of the gear frame, said member being in the form of a table, and a bolt mounted upon the main frame, said bolt having a normal tendency to move downwardly toward the table and arranged to ride over said table wherever said bolt extends forward of the gear frame whereby the two frames may be locked together by turning the gear frame on its vertical pivot with the bolt sliding on the table until the keeper socket comes in alignment with the bolt and the bolt moves into the keeper socket.

10. In a trailer having a main frame and a gear frame mounted to turn on a vertical pivot, a lock for locking the two frames together against relative movement, comprising a relatively long member positioned transversely of the gear frame, said member having an upper portion which projects outwardly from the gear frame and provides a relatively long table, said table being provided substantially centrally with a keeper socket, and a bolt mounted upon the main frame, said bolt having a normal tendency to move downwardly toward the table and arranged to ride on said table wherever said bolt extends forward of the gear frame whereby the two frames may be locked together by turning the gear frame on its vertical pivot with the bolt sliding on the table until the keeper socket comes in alignment with the bolt and the bolt moves into the keeper socket.

FREDERICK MALCOLM REID.